United States Patent [19]

Austrian

[11] Patent Number: 4,808,792
[45] Date of Patent: Feb. 28, 1989

[54] FISHING LURE RECONDITIONING APPARATUS

[75] Inventor: James A. Austrian, New York, N.Y.

[73] Assignee: Brainwaves, Inc., New York, N.Y.

[21] Appl. No.: 129,461

[22] Filed: Dec. 7, 1987

[51] Int. Cl.[4] ............................................... F22B 1/28
[52] U.S. Cl. .................................. 219/271; 126/369; 219/273; 211/DIG. 1
[58] Field of Search ............... 219/271, 272, 273, 274, 219/275, 276; 43/42.25; 211/DIG. 1; 248/309.4; 126/369

[56] References Cited

U.S. PATENT DOCUMENTS

| 2,152,897 | 4/1939 | Madore | 211/DIG. 1 |
| 2,476,722 | 7/1949 | Gelardin | 211/DIG. 1 |
| 2,491,860 | 12/1949 | Ingraham | 211/DIG. 1 |
| 2,523,372 | 9/1950 | Jennings | 219/271 |
| 3,026,882 | 3/1962 | Povec | 219/271 |
| 3,066,362 | 12/1962 | Merrigan | 219/271 |
| 3,152,240 | 10/1964 | Scott | 219/271 |
| 3,949,743 | 4/1976 | Shanbrom | 219/273 |
| 4,288,684 | 9/1981 | Katou | 219/273 |
| 4,401,102 | 8/1983 | Bovino et al. | 126/369 |

FOREIGN PATENT DOCUMENTS 518776  11/1955  Canada ............................ 219/273

*Primary Examiner*—Teresa J. Walberg
*Attorney, Agent, or Firm*—Mark T. Basseches; Paula T. Basseches

[57] ABSTRACT

A feathered fishing lure reconditioning device includes a vessel having a heater and a lid. The lid is equipped with a grate covering a cooling chamber connected by ducts to the vessel, the ducts being aligned with certain openings of the grate and offset from others, whereby vapors passing from the ducts through the aligned openings in the grate induce an influx of cooling air through the grate openings displaced from the ducts.

6 Claims, 2 Drawing Sheets

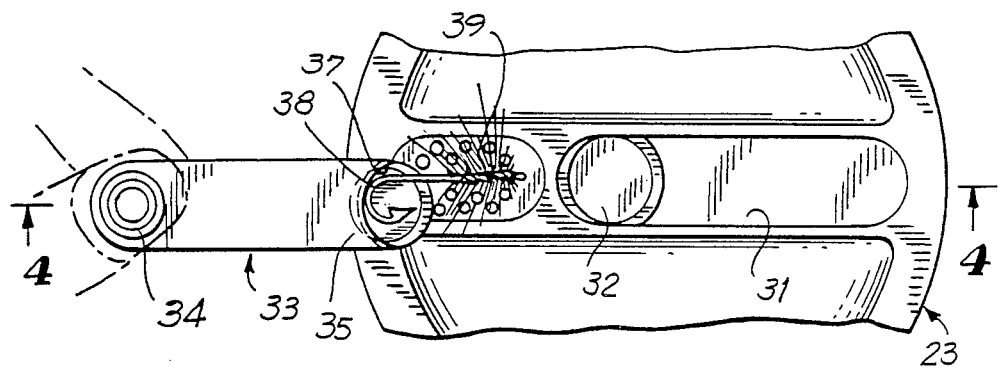
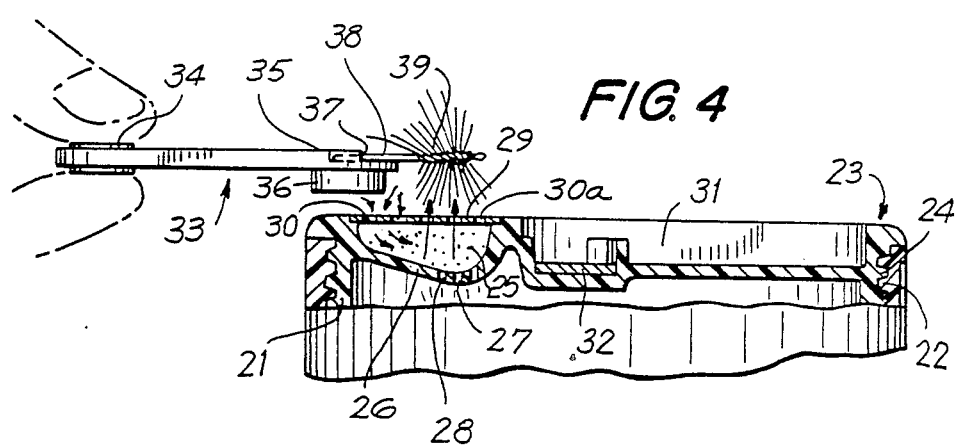
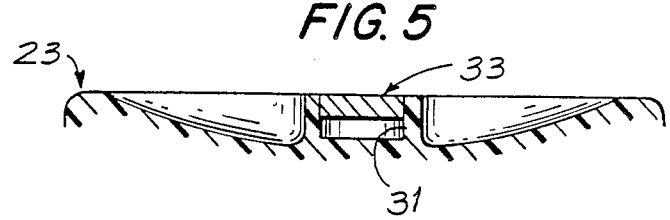

FISHING LURE RECONDITIONING APPARATUS

BACKGROUND OF THE INVENTION

1. Field of the Invention

The present invention is directed to apparatus for reconditioning fishing lures, and more particularly relates to a device for the restoration of feather material (keratin) as used in such lures. In the present application the term "feather" is intended to encompass other keratinaceous materials used in fishing lures.

2. The Prior Art

Fly fishing lures are conventionally formed of barbed fishing hooks, the shank components of which are surrounded by feathered material or materials. The specific materials employed and the manner in which they are combined and secured to the shank are often the result of extensive experimentation and handiwork. The objective of the fisherman is to create a lure or fly which, to the appearance of fish, will most closely resemble a living insect. Accordingly, many flies represent a significant investment of time and materials.

Of course, flies are commercially available and vary in expense in accordance with the sophistication and materials. It is generally recognized that flies used as fishing lures, to the fisherman, represent a commodity, the value of which cannot be directly correlated to the intrinsic worth of the components of the lure.

After use, it is conventional to wash the fly with fresh water for storage. After a use or uses, the fly will lose its initial appearance and thus be rendered ineffective as an attractor of fish.

It is known as a means for restoring the appearance of used flies to hold the same in the path of steam emitted from a kettle or teapot. Such practice, if carried out by an experienced person exercising great care, is effective to restore the feather components of the lure to their original fresh condition. However, if great care is not exercised, the lure may be irreparably damaged.

If the lure is placed in the area of live steam, the feather components may be destroyed in fractions of a second. If, on the other hand, the lure is spaced from the spout such that the steam has condensed to vapor at a reduced temperature, such vapors have no restorative influence and the result will merely be rewetting of the feathers.

SUMMARY OF THE INVENTION

The present invention may be summarized as directed to an apparatus for the reconditioning of feathered fishing lures comprised of a steam generating apparatus coupled with a cooling chamber. The chamber includes ducts extending into the vessel in which steam is formed and a covering grate or plate opening to the atmosphere.

The ducts from the steam forming chamber are aligned with certain of the openings of the grate, such that the vapors are ejected in a first path, including an influx of cooling air into the cooling chamber through other openings of the grate offset from the duct. In this manner there is assured a constant mixture of air and steam in the cooling chamber whereby the vapors emitted through the grate are cooled sufficiently to prevent damage to a lure held in the path of such vapors but are not cooled so much as merely to wet the feathered lure.

The invention is further directed to a device of the type described which includes a magnetic holder member mountable in the device adjacent the grate, the holder member being selectively usable to mount the lure such that the feathers are held in the path of the heated vapors or, alternatively, removed from the device and manually supported over the openings of the grate.

It is accordingly an object of the invention to provide a fishing lure reconditioning device capable of restoring the feathers thereof to their original condition.

A further object of the invention is the provision of a device of the type described characterized in the inclusion of a cooling chamber adjacent a steam generating chamber whereby an admixture of air and steam in the cooling chamber results in the cooling of the vapors released to a level optimal for the restoration of the feather components of fishing lures.

To attain these objects and such further objects as may appear herein or be hereinafter pointed out, reference is made to the accompanying drawings, forming a part hereof, in which:

FIG. 3 is a fragmentary plan view showing the device in use;

FIG. 4 is a side elevational view, partially in section, of the apparatus as depicted in FIG. 3, taken on the line 4—4 of FIG. 3;

FIG. 5 is a fragmentary section taken on the line 5—5 of FIG. 1.

Figure 2:
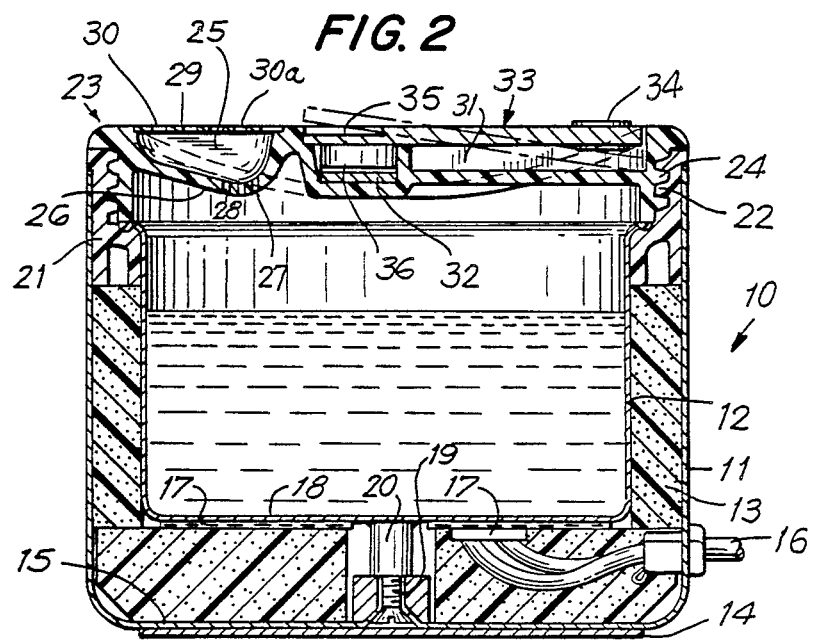
FIG. 2 is a vertical section taken on the line 2—2 of FIG. 1.

Referring now to the drawings, and particularly FIG. 2, a reconditioning apparatus 10 is comprised of an outer container 11, preferably of stainless steel or the like, having disposed therein an inner container 12. The containers 11 and 12 are separated by a mass of insulating material 13. Preferably an anti-skid pad 14 is secured to the bottom surface 15 of the container 11. Electrical mains wires 16 are connected to heater plate 17 underlying the floor 18 of the inner metallic container 12.

Containers 11 and 12 are secured in the noted position as by a machine screw 19 threaded into boss 20 fixed to the under surface of floor 18. An annular polymeric insert 21 projects upwardly beyond the containers 11, 12 and includes an internal thread 22.

A removable cover assembly 23 of essentially disk shape includes outwardly projecting threads 24 complementally engageable with threads 22.

The cover member 23 which, like the insert 21, is preferably molded of a heat resistant polymer (a preferred polymer being NORYL, a registered trademark of the DuPont Corporation) includes a depending cup member 25 defined on its lower extremity by wall 26.

The wall 26 slopes downwardly from the periphery of the cap to a low point 27, one or more ducts 28 aligned essentially perpendicular to the plane of the cap being formed through wall 26 adjacent such low point 27.

A metallic grate member 29 covers the upper surface of the cup 25, it being thus perceived that the cup 25 and grate member 29 together define a chamber.

The grate includes a plurality of through-going openings 30 and 30a, the openings 30a being essentially aligned in registry with the ducts 28, and the apertures 30 being laterally offset from such ducts.

Optionally but preferably, the cap 23 includes an upwardly open depression 31. A ferrous insert 32 is bonded within the depression.

A fly holder assembly 33 is adapted to be releasibly mounted in the recess or depression 31. The fly holder includes a gripper end 34 and a retainer end 35. The under surface of retainer end 35 has a permanent magnet 36 bonded thereto, whereby the holder assembly 33 may be received within the recess 31, wherein it is retained for storage by the attraction between the magnet 36 and insert 32.

The end 35 of the holder 33 may be formed with an arcuate recess area 37 whereby the hook 38 of a lure 39 may be mounted and retained by the force of magnet 36 acting through the body of the retainer 33, which is likewise preferably made of NORYL.

The operation of the device will now be described.

In use, the inner container 12 is partially filled with water and the wires 16 connected to an electrical source. When boiling occurs the device is ready for treatment of fishing lures.

Figure 1:
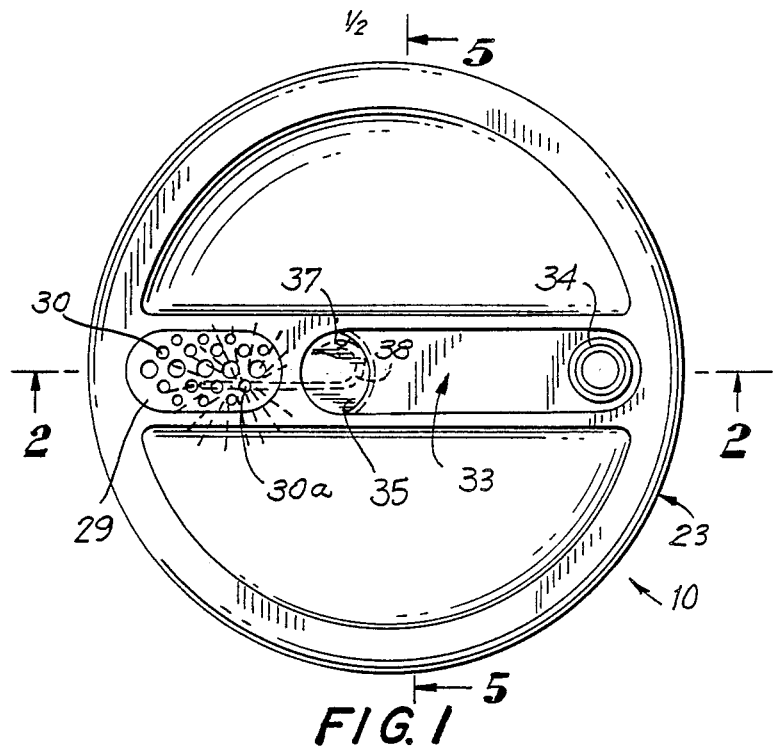
FIG. 1 is a top plan view of a device in accordance with the invention.

Lure 39 mounted on holder 33 may be treated either by manually positioning the holder such that the lure is disposed over the vapors emitted through grate 29 or by seating the retainer 33 in recess 41, as shown in dotted lines in FIG. 1.

Importantly, as diagrammatically shown in FIG. 4, the cup 25 acts as a cooling chamber for the vapors emitted through openings in the grate 29. This action, which is best appreciated from FIG. 4, occurs as a result of the steam passing through ducts 27 and outwardly through apertures 30a, drawing in cooling air through apertures 30 (see arrows, FIG. 4), as by a Venturi effect.

The temperature of the vapors above apertures 30a is optimally in the area of from about 130° to 150° F. (54° to 60° C.) and about 180° F. (82° C.) at the surface of the grate. Any condensate in the cooling chamber 25 will drip to the water in the inner container 12. Treatment times of from about 1 to 10 seconds will normally suffice to restore the feathers to their original condition.

From the foregoing it will be appreciated that there is provided in accordance with the invention an apparatus for reconditioning feathered fishing lures which minimizes the possibility of damage to the fragile feathers.

By the provision of a cooling chamber wherein recirculation and admixing of cooling air with the steam occurs, as by a Venturi effect, overheating of the lure and its consequent damage is prevented.

In addition, the metal grate acts as a heat sink, further reducing the temperature of the escaping vapors.

As will be appreciated by those skilled in the art, numerous vaiations of the apparatus in details of construction may be effected without departing from the spirit of the invention, which is to be broadly construed within the scope of the appended claims.

Having thus described the invention and illustrated its use, what is claimed as new and is desired to be secured by Letters Patent is:

1. Apparatus for the reconditioning of feathered fishing lures and the like comprising, in combination, a container having an open mouth portion, an electrical heating element mounted beneath said container, a cap member removably mounted in closing relation of said mouth portion, a grate formed on an external surface of said cap member, a plurality of vent openings formed in said grate, a cup member formed interiorly of said cap member in surrounding relation of said vent openings and defining a cooling chamber interposed between said container and said vent openings, at least one duct passage formed in said cup member and communicating said chamber with said container, said duct passage being coaxially aligned with certain of said openings in said grate and laterally offset from others of said openings whereby steam emitted from said duct passage through said certain openings induce air flow into said chamber through said others of said openings.

2. Apparatus in accordance with claim 1 wherein said grate is comprised of metal.

3. Apparatus in accordance with claim 2 wherein said cap member includes lure mounting means in proximate relation to said grate for supporting a lure over said grate.

4. Apparatus in accordance with claim 3 wherein said lure mounting means comprises a permanent magnet.

5. Apparatus in accordance with claim 3 wherein said lure mounting means is removably connected to said cap, said mounting means being comprised of a heat resistant plastic.

6. Apparatus in accordance with claim 5 wherein said lure mounting means includes a permanent magnet member and said cap includes a ferrous keeper, said mounting means being removably secured to said cap member by the attraction of said magnet member and keeper.

* * * * *